United States Patent [19]

Pastor et al.

[11] Patent Number: 4,600,442

[45] Date of Patent: Jul. 15, 1986

[54] PROCESS FOR THE REMOVAL OF IMPURITIES FROM OPTICAL COMPONENT MATERIALS

[75] Inventors: Ricardo C. Pastor, Manhattan Beach; Luisa E. Gorre, Oxnard, both of Calif.

[73] Assignee: Hughes Aircraft Company, Los Angeles, Calif.

[21] Appl. No.: 640,724

[22] Filed: Aug. 14, 1984

[51] Int. Cl.$^4$ .............................................. C03C 23/00
[52] U.S. Cl. .......................................... 134/2; 134/19; 264/1.2
[58] Field of Search ............... 134/2, 19, 25.1, 31, 134/42; 264/1.2; 156/605

[56] References Cited

U.S. PATENT DOCUMENTS

| | | | |
|---|---|---|---|
| 2,550,173 | 4/1951 | Swinehart et al. | 264/1.2 |
| 3,026,210 | 3/1962 | Coble | 264/1.2 X |
| 3,114,601 | 12/1963 | Letter | 264/1.2 X |
| 3,282,641 | 11/1966 | Sfiligoj et al. | 264/1.2 X |
| 4,013,796 | 3/1977 | Swinehart et al. | 264/1.2 X |
| 4,315,832 | 2/1982 | Pastor et al. | 156/605 X |

Primary Examiner—George Yeung
Attorney, Agent, or Firm—John A. Sarjeant; A. W. Karambelas

[57] ABSTRACT

A process is disclosed for the removal of water and water derived impurities, e.g. $OH^-$, substitutionally or interstitially incorporated in the structure of crystalline and amorphous materials, more specifically, in metal oxides, e.g. fused silica or aluminum oxide, wherein the material is exposed in powdered form to a gaseous mixture of halogen and carbon monoxide at a predetermined elevated temperature. The mixture of halogen and carbon monoxide reacts to cause the water and $OH^-$ ion concentration in the processed material to be reduced to an extremely low level. Materials purified by the process can be used to produce optical fibers and laser windows of excellent mechanical, thermal and optical properties.

7 Claims, 1 Drawing Figure

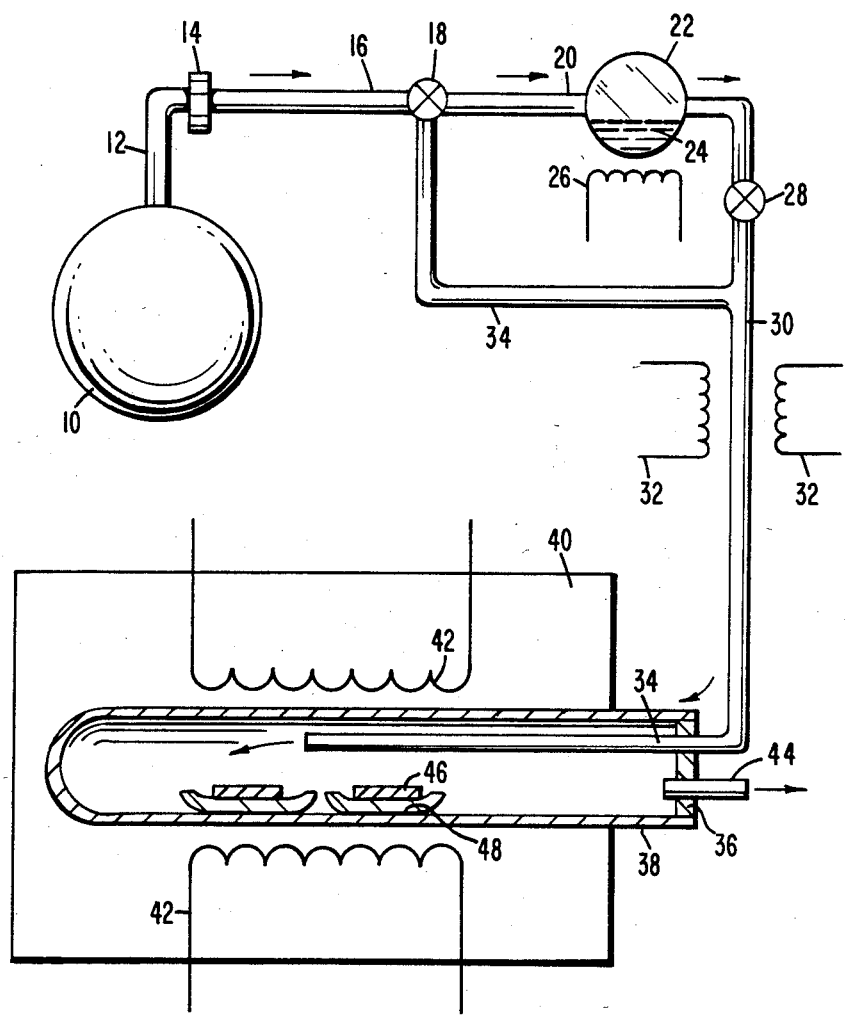

PROCESS FOR THE REMOVAL OF IMPURITIES FROM OPTICAL COMPONENT MATERIALS

BACKGROUND OF THE INVENTION

The present invention is directed, in general, to a method of removing water and water derived impurities, e.g., hydroxyl ion, which are substitutionally or interstitially incorporated in the structures of crystalline and amorphous materials specifically, metal oxides, utilized to produce optical components and, more particularly, to an improved reactive atmosphere process for removing such impurities.

A variety of materials utilized to produce optical components such as oxides of Group II, III, and IV materials, e.g., magnesia, alumina and silica and metal halides such as alkali halides, e.g., potassium chloride, alkaline earth halides such as calcium fluoride can be fabricated into high optical quality components. These materials because of their low optical absorption coefficients and mechanical and thermal characteristics are often considered for use in optical applications such as fiber optics and particularly in laser applications.

It has long been recognized that one of the limiting factors affecting the use of these optical materials is the purity of the material itself. Thus the presence of even trace amounts, e.g. 10 ppm or less of water or hydroxyl ion ($OH^-$) which are substitutionally or interstitially incorporated in the structures of the optical materials can deleteriously affect the phase stability, damage threshold and/or burn-out resistance to ionizing radiation of the laser window fabricated using these materials.

For example, considerable effort has been expended in trying to produce windows for high power $CO_2$ lasers. Such windows need a proper combination of mechanical, thermal and optical properties. Many metal halide and oxide materials are eliminated from consideration for this application because they fall in one or more of these necessary properties. For example, metal halides such as NaCl and KCl are among the few materials which, at least chemically and physically, seem to have the desired combination of properties. Unfortunately, windows produced from metal halide single crystals in part have suffered from levels of hydroxyl ion contamination which resulted in the windows having an undesirable degree of absorbancy of the laser beam. The absorbancy, in turn, caused the window to heat up and become distorted.

A similar problem of hydroxyl ion contamination is found in optical windows formed from fused silica. Because of its excellent ultraviolet transmission and physical and chemical stability, fused silica is an ideal refractive optical material. Unfortunately, optical glasses formed from fused silica are vulnerable to radiation darkening due to, inter alia, the presence of even low level $OH^-$ and water impurities in the material.

Hydroxyl ion and water contamination is also a limiting factor in the synthesis of alpha alumina ($\alpha$-$Al_2O_3$) by typical pyrolysis routes. Aluminum oxides exist in several different polymorphs or crystalline forms. Alpha alumina can be obtained by the pyrolysis of aluminum oxysalts, e.g. acetate, nitrate, and sulfate at elevated temperatures e.g., 1100°–1600° C. Because of its good optical transparency, high mechanical strength, and chemical inertness, high purity $\alpha$-$Al_2O_3$ is an important component in the manufacture of radiation hard leucosapphire crystal laser windows. However, in the pyrolysis reaction by which $\alpha$-$Al_2O_3$ is synthesised, it is very difficult to obtain 100% transformation of the aluminum oxysalts to this polymorph. This difficulty is believed due to the presence of $H_2O$ and $OH^-$ impurities in the structural make-up of the metastable aluminum oxide phases, formed during the pyrolysis reaction, which inhibit the polymorphic transition of these aluminum oxides to the $\alpha$-$Al_2O_3$ state. Thus, it is known to the art, e.g. Stumpf et al., *Ind. Eng. Chem.*, Vol. 42, pp. 1398–1403 (1950), Brindley et al., *J. Min. Soc. Am.*, Vol. 46, pp. 771–785 (1961) and Day et al., *J. Phys. Chem.*, Vol. 57, pp. 946–950 (1953) that the metastable $Al_2O_3$ phases contain traces of $H_2O$, sometimes as much as 2%. Many aluminum salts used as starting materials for the preparation of $\alpha$-$Al_2O_3$ contain water of hydration. In the presence of this water, the $OH^-$ is believed to be incorporated into the structural network by addition in accordance with the equation:

$$O^{--} + H_2O \rightarrow 2OH^-$$

Because of their ubiquitous nature, water and $OH^-$ are the most difficult trace impurities to remove from optical materials. One method developed for removing water derived impurities from the materials' structure is referred to in the art as the reactive atmosphere process (RAP) wherein the solid material containing the water derived impurity is heated at an elevated temperature, generally in excess of 1000° C. for oxide materials, in an atmosphere of a halogen gas such as iodine and a carrier gas such as oxygen or helium whereby the $OH^-$ contaminant in the material is replaced by $I^-$ with the simultaneous removal of interstitially present water contaminant. Thus, U.S. Pat. No. 4,315,832 discloses removing water and water derived impurities present in a neodymium-doped yttrium aluminum garnet crystal to improve the lasing efficiency thereof wherein the crystal is heated at 1500° C. or higher in an $I_2/O_2$ vapor atmosphere to remove $OH^-$ and water from the crystal.

Although $I_2/O_2$ RAP purification has been found effective in removing $OH^-$ and water from garnet crystals, this treatment has been found to be less efficient than desired, because $I_2/O_2$ RAP does not provide sufficient direct scavenging of $H_2O$ produced by outgassing of the reaction apparatus before such $H_2O$ and water derived impurities penetrate the condensed phase (solid) of the given crystal, resulting in incorporation of $OH^-$ into the crystal lattice by the reaction shown in the preceding equation.

SUMMARY OF THE INVENTION

In accordance with the present invention, a process for removing water and water derived impurities substitutionally or interstitially incorporated into crystalline and amorphous optical materials is provided.

The present invention relates to a process for removing water and water derived impurities from optical materials, in particular, metal oxides. This process comprises the step of exposing the metal oxide at an elevated temperature to a gaseous mixture of a halogen and carbon monoxide which causes the water and $OH^-$ ion concentration in the processed crystal to be reduced to an extremely low level.

The practice of the present invention overcomes the drawbacks of prior RAP purification procedures by providing a more efficient scavenging action which is adequate to scavenge even the outgassing of $H_2O$ and $H_2O$ derived impurities coming from the reaction apparatus. Whereas prior RAP processes provided for the use of a halogen to scavenge OH⁻, thus preventing OH⁻ incorporation into the crystal lattice, the present invention provides this same scavenging by the halogen combined with scavenging of H₂O molecules by the carbonyl halide (COX₂) reaction product of the halogen and carbon monoxide.

As will hereinafter be illustrated in detail, the mixture of halogen and carbon monoxide achieves a more thorough scavenging of water in the gas phase and OH⁻ in the condensed phase then can be effected by purification methods based on halogen/oxygen mixtures or either carbon monoxide or halogen, individually.

At temperatures above about 1200° K. (927° C.), the scavenging of water from metal oxide by the halogen/carbon monoxide RAP treatment is believed to be represented by the equations:

$$X_2 + H_2O \rightleftharpoons 2HX + \tfrac{1}{2}O_2 \qquad (1)$$

where, $X_2$ is $Cl_2$, $Br_2$ or $I_2$ $$CO + H_2O \rightleftharpoons CO_2 + H_2 \qquad (2)$$

the combined reaction of $X_2$ and CO being $$X_2 + CO + H_2O \rightleftharpoons 2HX + CO_2 \qquad (3)$$

The CO and $X_2$ reactants form carbonyl halide (COX₂) as an intermediary reactant, and COX₂ is a very reactive getter for water. In essence, equation (3) can be shown as the following two equations:

$$CO + X_2 \rightleftharpoons COX_2, \text{ and}$$

$$COX_2 + H_2O \rightleftharpoons CO_2(g) + 2HX(g).$$

In the practice of the process of the present invention, the metal oxide charge is placed in a high-temperature-resistant crucible/boat which is introduced into a reaction tube which is placed in a furnace. By way of example, for a reaction tube ranging between about 500 to about 2,000 cubic centimeters in capacity, a slow flow of carbon monoxide gas, e.g. 1 cubic centimeter per second (cc/sec.) is started to purge the reaction tube and ancillary equipment feeding into the reaction tube. After the equipment has been purged sufficiently, the carbon monoxide gas is swept through the halogen source to provide a halogen partial pressure of about 40 mm Hg. The apparatus is then gradually heated and the material is soaked in the halogen/carbon monoxide atmosphere for about 10–100 hours, after which the material is allowed to cool slowly in the presence of the gaseous phase halogen/CO reactive atmosphere to obtain the purified material.

The application of an I₂/CO RAP treatment as used in the present invention to the purification of fused silica has been found to be very effective for the removal of water derived impurities. The I₂/CO RAP treatment attacks both the outgas water and removes OH⁻ in the condensed phase. When amorphous or fused silica powder is processed using an I₂/CO gaseous mixture heated to about 1500° C. for about 10 hours, the silica powder is converted to a crystalline powder, β-cristobalite. Fused silica subjected to the I₂/CO RAP purification is remarkably different from commercially available fused silica due to the low concentration of impurities. For example, although the reported melting point of β-cristobalite is 1,705° C., the gas phase I₂/CO reactive atmosphere processed β-cristobalite melts at approximately >1,800° C. Further, the refractive index of the RAP processed silica is higher, which is consistent with a lowered water content. Note in this regard, G. Hetherington and K. H. Jack, *Phys. & Chem. Glasses*, 3, 129 (1962). These authors demonstrated that the less water in a glass, the higher the refractive index. In addition, the OH⁻ content expressed in weight percent was shown to be one-tenth of the optical density per millimeter at 2.73 μm. Fused silica produced using the process of the present invention exhibits a lower value of ΔRI and an increased Knoop hardness in comparison with fused silica commercially available as produced by other processes.

With regard to the effect on optical properties, I₂/CO RAP purified fused cristobalite simultaneously exhibits increased resistance to nuclear radiation with no damage up to 10 Mrad of Co-60 gamma radiation and a greatly increased IR transparency as compared to commercially available fused silicas.

When aluminum oxysalts, such as ammonium alum and aluminum sulfate, are pyrolyzed in an I₂/CO RAP environment, more efficient transformation to substantially α-Al₂O₃ occurs at a given temperature than if the separate components I₂ and CO are used individually in the RAP processing.

BRIEF DESCRIPTION OF THE DRAWING

The FIGURE illustrates, in schematic form one embodiment of an apparatus for carrying out the process of the present invention.

DETAILED DESCRIPTION OF THE INVENTION

In the FIGURE, high purity (99.9% pure) carbon monoxide is provided in a container 10, which is introduced through an inlet tube 12 made of Teflon, pyrex or polyethylene, into a flow meter 14, where the flow of the carbon monoxide is adjusted to a desired value, such as the 1 cc/sec previously described in the case of a reaction tube about 500 to about 2,000 cc in capacity. The carbon monoxide passes from the flow meter 14, through a tube 16, made of Teflon, pyrex or polyethylene through a valve 18 and through a tube 20, also made of Teflon, pyrex or polyethylene into a pyrex chamber 22 which contains a condensed halogen source 24 such as liquid bromine, carbon tetrachloride or solid elemental iodine. The chamber 22 is heated to obtain a halogen partial pressure of about 40 mm Hg, and this is accomplished by means of the heating element 26. The resistance heating element may be made of Nichrome and is activated by applying a controlled voltage thereto. A thermocouple (not shown) is inserted between the outside wall of the chamber 22 and the heating element 26 in order to monitor the temperature of the chamber 22. The halogen vapor is mixed with carbon monoxide gas in the container 22 and the halogen/CO gas mixture is then passed through a valve 28 to a Teflon tube 30. The halogen/CO gas mixture is maintained at an elevated temperature by heating elements 32 which surround tubing 30 to prevent condensation or crystallization of the halogen, e.g., crystallization of I₂(s) if it is chosen as the reactant halogen gas. The valve 18 may be constructed as a gas bypass valve whereby carbon monoxide gas may bypass entry into the container 22 and be passed directly into the tube 30 via line 34 such that admixture with the halogen in the container 22 can be selectively prevented. Valve 28 is provided in tube 30 to shut off the flow of halogen gas into the tube 30, when such shut-off is desired. Similarly, valve 18 can be placed in the closed position to prevent passage of carbon monoxide gas either to the container 22 or the tube 30. The halogen gas mixed with the carbon monoxide gas in the container 22 passes through the tube 30 to a connecting, high purity (99.9%) alumina tube 34 which passes through a vitreous silica cap 36 and then into a high purity alumina reaction tube 38. Within the reaction tube 38 are one or more platinum lined alumina boats 48 which contain the selected material to be processed.

The metal oxide is processed in the form of a powder, in order to provide increased reaction contact surface for the RAP. The reaction tube 38 is provided with a thermocouple (not shown) which is placed in close proximity to the selected powdered material in the boats 40 and is used to monitor the temperature at which the selected material is heated in the reaction tube 38. The reaction tube 38 is contained within a furnace 40 provided with heating elements 42 which are used to heat the reaction tube to a predetermined elevated temperature at which water and other impurities will be removed from the material by the halogen/CO gaseous mixture.

The reaction tube 38 is also provided with alumina or vitreous silica tubing 44 through which gas reactants are exhausted from the reaction tube 38 and ultimately enter an exhaust chamber (not shown) where excess halogen is condensed or solidified and is trapped. From this exhaust chamber, the gas mixture passes to a scrubber (not shown) so that any uncondensed halogen or other environmentally undesirable gaseous products are removed before the exhaust gas is released to the surrounding atmosphere.

In operation, gaseous high purity carbon monoxide from the container 10 is arranged to be metered by flow meter 14 at the rate of about 1 cc/sec. into the container 22 through tube 16, the halogen contents 24 of the container 22 being heated to vapor form by the heater 26. By way of example, if the halogen is elemental iodine, the container 22 is heated from about 86° C. to about 90° C. to vaporize the solid iodine crystals. The gaseous carbon monoxide is admixed with the vaporized iodine to provide an $I_2$/CO mixture containing about 5 percent iodine in carbon monoxide at a molar ratio of about 1:18. Thus, the molar amount of carbon monoxide is substantially greater than the stoichiometric amount necessary for carbon monoxide to react with halogen to form carbonyl halide.

The material 46 to be purified by the $I_2$/CO gaseous mixture is placed in the platinum boats 48 as a powder and the boats, filled with the charge, are placed in reaction tube 38 and the assembly positioned in electric furnace 40. The furnace temperature is so adjusted by the coils 42 that the boat temperature is elevated to a temperature of approximately 1000°–1500° C. or more, at which temperature the $I_2$/CO gaseous mixture will attack both the water impurities present in the material and displace the $OH^-$ in the condensed phase, the halogen ion displacing the $OH^-$ in the lattice structure of the material. The reactive $I_2$/CO gaseous mixture is passed over the powder for approximately 16 to about 64 hours and preferably only for about 16 hours to effect the RAP purification of the powder.

If desired, such as in the case of fused silica (α-cristobalite) after the water-free powder 46 has cooled to ambient temperature, the boats 48 containing the powder 46 are transferred to another furnace (not shown) which is alternately evacuated and purged with helium. The powder is then fused under a blanket of helium gas at a temperature of about 1900° C. for about one hour and, upon cooling, the fused silica undergoes a polymorphic transition to fused cristobalite having a melting point in excess of 1800° C.

The following examples are set forth to illustrate the present invention. They should not be deemed as limiting the scope thereof.

EXAMPLE I

Using the apparatus schematically shown in the FIGURE, dehydrated ammonium alum ($NH_4Al(SO_4)_2$) in powdered form was placed in a single platinum-lined alumina boat 48. The water of hydration had been previously removed from the ammonium alum by heating the hydrated salt $NH_4Al(SO_4)_2 \cdot 12H_2O$ in a vacuum oven at 100° C. for 70 hours. The boat 40 loaded with the dehydrated ammonium alum was placed in reaction tube 38 which was then sealed with silica cap 36 and placed in the furnace 40. The heating elements 42, which were silicon carbide rods, were activated by applying a controlled voltage thereto, and the temperature was raised to 1070° C. High purity CO was metered from the container 10 through the flow meter 14 at a flow rate of about one cc/sec. into container 22 containing iodine vapor. The iodine vapor had been produced by activating the heating element 26 which was a nichrome wire by applying a controlled voltage to this wire, to raise the temperature in the container 22 to approximately 86°–90° C., to vaporize the $I_2$. The mixture of $I_2$ and CO mole ratio was 1:18 or about 5% $I_2$ gas in the CO gas. The $I_2$/CO gaseous mixture was passed through valve 28 in the open position into tube 30 and then into the reaction tube 38, which had been heated to a temperature of 1070° C. The dehydrated ammonium alum was exposed to the $I_2$/CO gaseous mixture for 16 hours at 1070° C. Thereafter the reaction tube 38 was cooled to room temperature and the platinum boat 40 and its contents removed therefrom. The contents of the boat were analyzed by x-ray powder diffraction. The results of these studies are recorded in Table I below.

The procedure of Example I was repeated with the exception that $Al_2(SO_4) \cdot 18H_2O$, dehydrated at 100° C. for 70 hours, was substituted for the dehydrated ammonium alum. The results of the $I_2$/CO RAP purification of the dehydrated aluminum sulfate, as determined by x-ray powder diffraction studies are also recorded in Table I below.

For purposes of contrast, the procedure of Example I was repeated with the exception that either valve 18 was placed in the closed position so that only vaporized iodine was used for the RAP treatment and helium gas from another source (not shown in the FIGURE) was used as the carrier gas or valves 18 and 28 were adjusted so as to shut off passage of CO gas into chamber 22 and passage of $I_2$ vapor into line 30 so that only CO gas was used for RAP treatment of the crystalline powder. In a separate series of comparative runs, the gaseous RAP treating agent was a mixture of water vapor and oxygen. The results of these comparative $I_2$ or CO singular RAP treatments of ammonium alum and aluminum sulfate as well as $H_2O$/CO treatment are also recorded in Table I below, these data being designated by the symbol "C".

TABLE I

Anhydrous aluminas obtained from the RAP treatment of aluminum sulfates (16 hours @ 1070° C.)

| RUN NO. | RAP ATMOS-PHERE | ALUMINUM SULFATE STARTING MATERIAL | $Al_2O_3$ POLYMORPH PRODUCT |
|---|---|---|---|
| 1. | $I_2/CO$ | $NH_4Al(SO_4)_2$ | $\alpha$- |
| 2. | $I_2/CO$ | $Al_2(SO_4)_3$ | $\alpha$- |
| $C_1$ | $H_2O/O_2$ | $NH_4Al(SO_4)_2$ | $\alpha$- and some $\kappa$- |
| $C_2$ | $H_2O/O_2$ | $Al_2(SO_4)_3$ | $\alpha$- and some $\kappa$- |
| $C_3$ | CO | $NH_4Al(SO_4)_2$ | $\alpha$- and $\delta$- |
| $C_4$ | CO | $Al_2(SO_4)_3$ | $\alpha$- and some $\delta$- |
| $C_5$ | $I_2/He$ | $NH_4Al(SO_4)_2$ | $\alpha$- and little $\delta$- |
| $C_6$ | $I_2/He$ | $Al_2(SO_4)_3$ | $\delta$- and some $\alpha$- |

The x-ray power pattern results recorded in Table I show the effect of impurity removal on polymorphic transitions in aluminum oxides. Thus $I_2/CO$ RAP treatment of dehydrated ammonium alum and aluminum sulfate at 1070° C. for 16 hours was effective in $H_2O$-/$OH^-$ removal and 100% $\alpha$-$Al_2O_3$ was produced (Run Nos. 1-2). RAP treatment with $H_2O/O_2$ was substantially ineffective for transformation to $\alpha$-$Al_2O_3$ (Runs $C_1$-$C_2$). RAP treatment with CO alone had some effect on impurity removal, but was insufficient for 100% transformation to $\alpha$-$Al_2O_3$, (Run Nos. $C_3$-$C_4$) as was $I_2$ alone, which was marginally effective for impurity removal (Run Nos. $C_5$-$C_6$).

The data in Table I demonstrates that the gaseous $I_2/CO$ reactive atmosphere is necessary for the removal of residual impurities in the metastable polymorphs of aluminum oxide that block the transformation to the $\alpha$-$Al_2O_3$ state. By the use of the $I_2/CO$ RAP treatment for the removal of impurities, a lower temperature and-/or shorter processing time is required to attain 100% transformation to the $\alpha$-$Al_2O_3$ state. Thus, the data in Table I therefore demonstrates that $\alpha$-$Al_2O_3$ can be obtained from aluminum salts such as $NH_4Al(SO_4)_2$ and $Al_2(SO_4)_3$ using an $I_2/CO$ RAP environment at 1070° C., a temperature considerably lower than that reported in the art, e.g. greater than 1600° C., as reported by Yokokawa et al., *J. Phys. Chem.*, Vol. 68, pps. 3246–3249 (1964) and 30° C. lower than reported by Wilson et al., *J. Sol. State Chem.*, Vol. 34, pps. 314–322 (1980) using boehmite ($\alpha$-ALOOH) as the starting material.

EXAMPLE II

The procedure of Example I was repeated, with the exception that the $I_2/CO$ RAP gas combination was passed over fused silica powder at about 1500° C. for 10 hours which converted the fused silica powder into $\beta$-cristobalite which on cooling was transformed into the $\alpha$-polymorph. The $I_2/CO$ treated crystalline silica powder was transferred to another furnace which was alternatively evacuated and purged with helium. The crystalline powder was fused under helium at a temperature of about 1900° C. to form fused cristobalite. The properties of the $I_2/CO$ RAP treated silica powder are recorded in Table II below.

For purposes of comparison, the procedure of Example II was repeated with the exception that a gas mixture of $I_2/O_2$ was substituted for the $I_2/CO$ gas mixture.

The absorption coefficient data for RAP treated fused silica and commercially available fused silica, Infrasil, are presented in TABLE II. Both the $I_2/O_2$ and $I_2/CO$ treated materials exhibited a significant and desirable reduction in absorption over the commercially available Infrasil.

TABLE II

| Absorption Coefficient | RAP Gas Mixture | | Infrasil |
|---|---|---|---|
| | $I_2/CO$ | $I_2/O_2$ | |
| Path Length, cm | 0.426* | 0.303* | 2.896 |
| Peak Absorption Coefficient, $cm^{-1}$ | 0.18* | 0.074** | 0.22*** |

*average of 2 runs
**average of 3 runs
***estimated

While specific components of the present system are defined above, additional variables may be utilized to enhance or otherwise improve the system of the present invention. These variables are intended to be included herein.

Although variations are shown in the present application, many modifications will occur to those skilled in the art upon a reading of the present disclosure. These, too, are intended to be included herein.

What is claimed is:

1. A process for the removal of water and water derived impurities substitutionally or interstitially incorporated in the structures of crystalline and amorphous optical materials consisting of metal oxides, comprising heating the optical material to a temperature of greater than 1000° C., and thereafter exposing the heated optical material at said temperature to a gas phase reactive atmosphere containing a mixture of a halogen and carbon monoxide for a period of time, the molar amount of carbon monoxide is substantially greater than the stoichiometric amount necessary for carbon monoxide to react with halogen to form carbonyl halide, the amounts of carbon monoxide and halogen being sufficient to react with the water and water derived impurities surrounding and within the optical material to reduce the impurities to an extremely low level.

2. The process of claim 1 wherein the optical material is selected from the group consisting of metal oxides of Periodic Table Group II, III and IV materials.

3. The process of claim 2 wherein the material is fused silica.

4. The process of claim 2 wherein the material is aluminum oxide.

5. The process of claim 1 wherein the halogen/carbon monoxide molar ratio is about 1:18.

6. The process of claim 1 wherein the halogen is elemental iodine.

7. The process of claim 1 wherein the optical material is exposed to the mixture of halogen and carbon monoxide at temperatures ranging between about 1000° C. to about 1500° C. for a period of about 10 to about 100 hours.

* * * * *

UNITED STATES PATENT AND TRADEMARK OFFICE
CERTIFICATE OF CORRECTION

PATENT NO. : 4,600,442

DATED : July 15, 1986

INVENTOR(S) : Ricardo C. Pastor
Luisa E. Gorre

It is certified that error appears in the above—identified patent and that said Letters Patent is hereby corrected as shown below:

Column 6, line 66, delete "CO" and insert --$O_2$--.

Signed and Sealed this

Eleventh Day of November, 1986

*Attest:*

DONALD J. QUIGG

*Attesting Officer*  *Commissioner of Patents and Trademarks*